United States Patent [19]
Sakai et al.

[11] Patent Number: 5,721,488
[45] Date of Patent: Feb. 24, 1998

[54] METHOD AND APPARATUS FOR TESTING INTEGRATED MAGNETIC HEAD ASSEMBLY

[75] Inventors: Masanori Sakai, Miyota-machi; Katsuhiko Tomita, Narashino; Yuzuru Iwai, Komoro, all of Japan

[73] Assignee: TDK Corporation, Tokyo, Japan

[21] Appl. No.: 656,846

[22] Filed: May 30, 1996

[30] Foreign Application Priority Data

Jan. 6, 1995 [JP] Japan ............................ 7-156670

[51] Int. Cl.$^6$ .......................... G01R 33/12; G11B 5/455; G11B 5/39
[52] U.S. Cl. .................. 324/210; 29/593; 324/232; 324/235
[58] Field of Search ............... 324/210–212, 324/232, 235; 29/593

[56] References Cited

U.S. PATENT DOCUMENTS

| | | |
|---|---|---|
| 3,706,926 | 12/1972 | Barrager et al. .................. 324/210 |
| 3,710,235 | 1/1973 | Barrager et al. . |
| 5,134,366 | 7/1992 | Kirk . |
| 5,479,098 | 12/1995 | Yokoyama et al. ................ 324/212 |
| 5,589,777 | 12/1996 | Davis et al. ................ 324/210 X |

FOREIGN PATENT DOCUMENTS

| | | | |
|---|---|---|---|
| 73221 | 4/1986 | Japan | .................. 324/210 |
| 158478 | 7/1988 | Japan | .................. 324/210 |
| 6-150264 | 5/1994 | Japan . | |
| 1343860 | 1/1974 | United Kingdom . | |

OTHER PUBLICATIONS

Buckthal, W.H.; Read/Write Head Test IBM Technical Disclosure Bulletin, vol. 17, No. 1, p. 39 Jun. 1974.

*Primary Examiner*—Gerard R. Strecker
*Attorney, Agent, or Firm*—Collard & Roe, P.C.

[57] ABSTRACT

A method and apparatus for testing an integrated magnetic head assembly for normal operation. The head assembly includes an inductive write element and a MR read element. The method includes a step of applying an external alternating magnetic field to a plurality of magnetic head assemblies which are aligned on a head block and are not yet individually separated from the head block, in a direction perpendicular to an ABS of the head block, and also applying high frequency current to the inductive write element so that alternating leakage magnetic field from the inductive write element is applied to the MR read element, and a step of measuring varying resistance characteristics of the MR read element with respect to the variation of the external alternating magnetic field and to the variation of the alternating leakage magnetic field.

8 Claims, 3 Drawing Sheets

METHOD AND APPARATUS FOR TESTING INTEGRATED MAGNETIC HEAD ASSEMBLY

FIELD OF THE INVENTION

The present invention relates to a method and apparatus for testing an integrated magnetic head assembly including a thin film inductive write element for recording information into a magnetic medium such as a magnetic disk and a thin film magnetoresistive (hereinafter referred as MR) read element for reproducing information from the magnetic medium.

DESCRIPTION OF THE RELATED ART

Recently, an integrated magnetic head assembly provided with both an inductive write element and a MR read element has been developed as a thin film magnetic head assembly for a magnetic medium such as a magnetic disk.

Since the MR read element utilizes the MR effect occurring in a thin film layer made of ferromagnetic material such as permalloy, a high reading output can be provided irrespective of relative speed between the head assembly and the magnetic medium. However, by using the ferromagnetic material, there is a possibility of producing a defective MR read element which can result in Barkhausen noise.

As is known, Barkhausen noise is produced due to structure defect in the magnetic material, whereby its magnetic wall is disturbed from freely moving. Thus, it cannot be expected for a magnetic head assembly with such defective MR element to perform normal reproduction operation over all its operating regions. Therefore, it is necessary to confirm at each test after manufacturing that a finished magnetic head assembly with a MR read element is a good article and will not produce any inherent noise such as Barkhausen noise.

The conventional method for testing whether Barkhausen noise is produced or not from a MR head assembly consists of a process of attaching the finished MR head assembly to its supporting suspension, a process of practically operating the MR head assembly above the rotating magnetic disk, a process of measuring output voltage wave shape from the MR head, and a process of judging from the measured wave shape whether Barkhausen noise is produced or not.

However, according to this conventional testing method, since it is necessary to practically operate the finished MR head assembly on the rotating disk, the testing procedure cannot be easily executed and furthermore it will take a long period of time for testing.

Japanese Patent Unexamined Publication No. 6(1994)-150264 filed by the same applicant of the present invention discloses an improved MR head testing method. In this testing method, an external alternating magnetic field is applied, in a direction perpendicular to an Air Bearing Surface (ABS), to a plurality of MR head assemblies which are aligned on a head block and are not yet individually separated, and electromagnetic transfer characteristics of each of the MR head assemblies with respect to the varying external magnetic field are measured.

However, even by means of this testing method disclosed in the above-mentioned Publication, it is difficult to check whether Barkhausen noise is produced or not within a Short period because the Barkhausen noise will be produced at random.

SUMMARY OF THE INVENTION

It is therefore an object of the present invention to provide a method and apparatus for testing an integrated magnetic head assembly, whereby a higher probability of detecting Barkhausen noise produced in the magnetic head assembly can be attained.

Another object of the present invention is to provide a method and apparatus for testing an integrated magnetic head assembly, whereby the test can be achieved within a extremely shorter period of time.

The present invention relates to a method and apparatus for testing an integrated magnetic head assembly for normal operation. The head assembly includes an inductive write element and a MR read element. According to the present invention, particularly, the method includes a step of applying an external alternating magnetic field to a plurality of magnetic head assemblies which are aligned on a head block and are not yet individually separated from the head block, in a direction perpendicular to an ABS of the head block, and also applying high frequency current to the inductive write element so that alternating leakage magnetic field from the inductive write element is applied to the MR read element, and a step of measuring varying resistance characteristics of the MR read element with respect to the variation of the external alternating magnetic field and to the variation of the alternating leakage magnetic field.

According to the present invention, also, the apparatus includes a probe unit for electrically contacting to input terminals of the inductive write element and to output terminals of the MR read element of each of magnetic head assemblies which are aligned on a head block and are not yet individually separated from the head block, an external field applying unit for applying an external alternating magnetic field to the magnetic head assemblies aligned on the head block, in a direction perpendicular to an ABS of the head block, a current applying unit for applying high frequency current to the inductive write element via the probe unit so that alternating leakage magnetic field from the inductive write element is applied to the MR read element, and a unit for measuring varying resistance characteristics of the MR read element with respect to the variation of the external alternating magnetic field and to the variation of the alternating leakage magnetic field, by receiving output voltage across the output terminals of the MR read element via the probe unit when the external alternating magnetic field is applied to the magnetic head assemblies and the high frequency current is applied to the inductive write element.

Since the alternating leakage magnetic field with a high frequency due to the write current is applied to the MR read element in addition to the external alternating magnetic field which is applied to the MR read element in a direction perpendicular to the ABS of the head block, possible Barkhausen noise can be detected with a higher probability and also this detection and judgment of whether good article or not can be extremely quickly completed. Furthermore, since the alternating leakage flux passes not only the MR read element but also pole portions of the inductive write element, defect of the magnetic domain structure in the pole portions can be also checked.

It is preferred that the frequency of the high frequency current applied to the inductive write element is much higher than the frequency of the external alternating magnetic field. Thus, Barkhausen noise can be detected with a very high probability.

It is also preferred that the high frequency current applied to the inductive write element is a rectangular wave shaped current.

It is also preferred that the external alternating magnetic field is a sine wave shaped magnetic field.

Further objects and advantages of the present invention will be apparent from the following description of the preferred embodiments of the invention as illustrated in the accompanying drawings.

DESCRIPTION OF THE PREFERRED EMBODIMENTS

Figure 1:
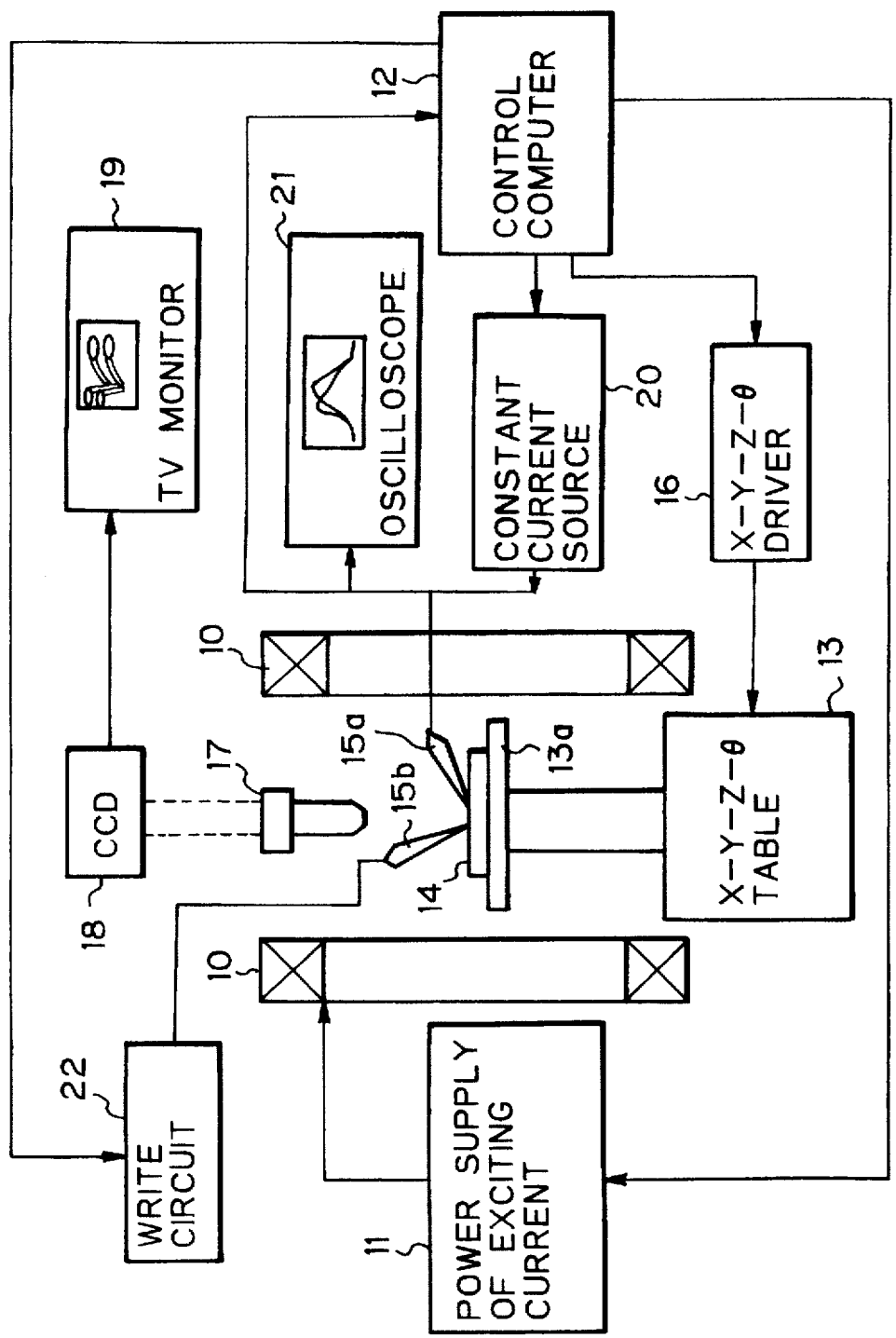
FIG. 1 is a block diagram schematically showing a circuit structure of a preferred embodiment of an apparatus for testing an integrated magnetic head assembly, according to the present invention.

In FIG. 1 which schematically shows a circuit structure of a preferred embodiment of an apparatus for testing an integrated magnetic head assembly including a thin film inductive write element and a thin film MR read element, reference numeral 10 denotes a Helmholtz coil (air-core coil) for producing an external alternating magnetic field to be applied to the MR read element. In this embodiment, the Helmholtz toll 10 is arranged such that its longitudinal axis is vertically directed (up-down direction in the figure). A power supply 11 for providing exciting current to the Helmholtz coil 10 is electrically connected to the Helmholtz coil 10. This power supply 11 is controlled by a control computer 12. In the Helmholtz coil 10, a platform 13a of a X-Y-Z-θ table 13 and a head block 14 temporally fixed on the platform 13a are disposed. The X-Y-Z-θ table 13 is electrically connected via a X-Y-Z-θ driver 16 to the control computer 12.

The head block 14 is an article in the manufacturing process of the magnetic head assemblies and has a plurality of aligned integrated magnetic head assemblies which are not individually separated yet. Each of the integrated magnetic head assemblies has both an inductive write element and a MR read element. This head block 14 is provided by forming a large number of integrated magnetic head assemblies arranged in matrix on a wafer according to thin-film technology, by cutting the wafer into bar shaped blocks so that each block has the aligned magnetic head assemblies, and by grinding an Air Bearing Surface (ABS) 14a (FIG. 3) of the head block 14 so as to adjust gap-depth of the head assemblies. By this adjustment of the gap-depth, each of the head assemblies will provide final output characteristics.

Figure 3:
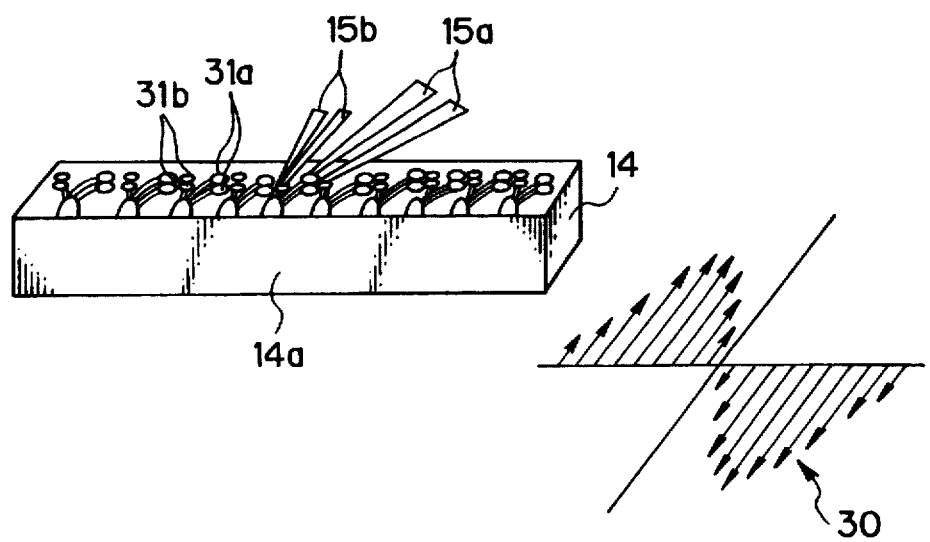
FIG. 3 is a view illustrating electrodes of the tested magnetic head assembly on a head block and probe pins of the test apparatus and also illustrating an external alternating magnetic field applied to the head block.

First probe pins 15a are fixed at a standstill position and the head block 14 is aligned with the first probe pins 15a. This alignment is performed by the X-Y-Z-θ table 13 driven by the X-Y-Z-θ driver 16 so that the first probe pins 15a can electrically contact with output terminals 31a of the MR read element of the desired integrated magnetic head assembly formed on the head block 14, as illustrated in FIG. 3. The alignment of the output terminals 31a with respect to the first probe pins 15a can be monitored by means of a CCD camera 18 which picks up image of this alignment portion via an optical system 17 such as an objective lens and by means of a TV monitor 19. The X-Y-Z-θ driver 16 is controlled by the control computer 12.

Second probe pins 15b are also fixed at a standstill position and the head block 14 is aligned with the second probe pins 15b. This alignment is also performed by the X-Y-Z-θ table 13 driven by the X-Y-Z-θ driver 16 so that the second probe pins 15b can electrically contact with input terminals 31b of the inductive write element of the desired integrated magnetic head assembly formed on the head block 14, as illustrated in FIG. 3. The alignment of the input terminals 31b with respect to the second probe pins 15b also can be monitored by means of the CCD camera 18 and the TV monitor 19. In practice, the first and second probe pins 15a and 15b are integral with each other and thus the alignment of the these probe pins 15a and 15b with respect to the respective terminals 31a and 31b will be simultaneously performed.

The second probe pins 15b are electrically connected to a write circuit 22, namely a write current source constituted by for example a head amplifier used in a disk driver device. High frequency write current from the write circuit 22 is provided to the inductive write element of the magnetic head via the second probe pins 15b. This write current may be rectangular wave current with a frequency normally used for writing in the magnetic head (1 to 80 MHz).

The first probe pins 15a are electrically connected to a constant current source 20 for providing a sense current to the MR read element. The first probe pins 15a are also connected to an oscilloscope 21 for displaying wave shape of output voltage from the MR read element and to the control computer 12 which receives and analyzes this output voltage.

The power supply 11, the X-Y-Z-θ driver 16, the constant current source 20 and the write circuit 22 are connected to the computer 12 and perform predetermined processes in response to commands from the computer 12.

An electrical heater (not shown) may be attached in or under the platform 13a so as to heat the head block 14 during testing. This heating will forcibly increase the temperature of the head block 14 to that near its normal operating temperature, for example 100°C., and thus the probability of detecting Barkhausen noise will be much more increased.

Figure 2:
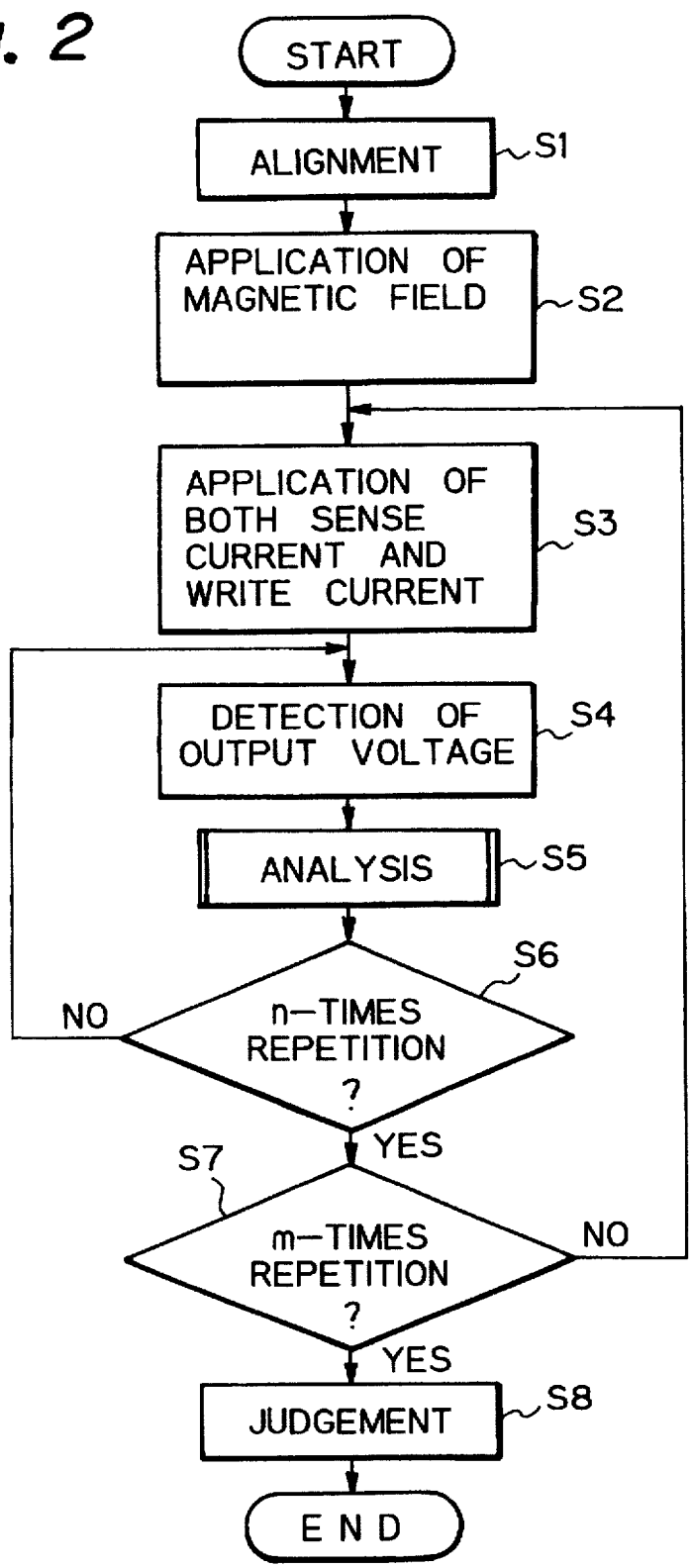
FIG. 2 is a flow chart schematically illustrating a part of control program of a computer shown in FIG. 1.

Referring to FIG. 2 which is a flow chart schematically illustrating a part of control program of the computer 12, the method of testing the integrated magnetic head assembly will be described in detail.

First, at step S1, alignment of the output terminals of the MR read element and the input terminals of the inductive write head of the magnetic head assembly to be tested on the head block 14 which is fixed on the platform 13a of the X-Y-Z-θ table 13, with the first and second probe pins 15a and 15b, respectively, is executed. This alignment will be performed by moving the X-Y-Z-θ table 13 in accordance with instruction from the computer 12 using an well known alignment technique.

At step S2, intensity and frequency of the external alternating magnetic field from the Helmholtz coil 10 are determined, and then application of the magnetic field to the head block 14 is started. As is well known, the Helmholtz coil produces magnetic field with an intensity which is proportional to the applied current in a direction along its longitudinal axis. Thus, at step S2, magnitude and frequency of drive current are instructed from the computer 12 to the power supply 11. The drive current has an alternating wave shape such as sine wave shape and its frequency is at the commercial frequency or more up to microwave frequency for example.

FIG. 3 also illustrates an external alternating magnetic field applied to the head block 14. This direction of the external magnetic field is the same direction as that of magnetic field applied to the magnetic head assembly practically flying above a magnetic medium, namely is a direction perpendicular to the ABS 14a of the head block 14. Wave shape of the external magnetic field is, as shown by a reference numeral 30 in FIG. 3, alternating sine wave. Intensity of the external magnetic field 1s preferably an intensity practically applied to the MR head from a magnetic medium for example several tens Oe. However, the intensity of the magnetic field applied to the head block 14 can be optionally selected within a range of 1 to 500 Oe.

Then, at step S3, application of sense current into the MR read element in the magnetic head assembly to be tested and application of rectangular wave shaped write current with a predetermined frequency and a predetermined amplitude into the inductive write element in this magnetic head assembly are started by instructing the constant current source 20 and the write circuit 22 to do so. Thus, an alternating leakage magnetic field with a high frequency due to the write current will be applied to the MR read element in addition to the external magnetic field. Frequency of the write current is within a normal range used for writing, for example 1 to 80 MHz. Preferably, this frequency of the write current is very higher than that of the external magnetic field applied from the Helmholtz coil 10. The magnitude of the sense current may be a predetermined fixed value or a variable value.

At step S4, output voltage across the output terminals of the MR read element, corresponding to resistance of the MR read element, is detected under a condition where the external alternating magnetic field, the high frequency alternating leakage magnetic field from the inductive write element and the sense current are applied to the MR element. This detection should be carried out for a time equal to or longer than one period of the external magnetic field. The detected output voltage is provided to the computer 12 and then A/D converted into digital input data.

At the next step S5, the input data is analyzed. Namely, the computer 12 calculates, from the input data, continuity and inclination of wave shapes of the MR loop, and thus provides degree and magnitude of possible Barkhausen noise from this MR read element. For this purpose, the input data representing the output voltage variation when the external alternating magnetic field is applied for one period should be prepared.

Thereafter, the detection of the output voltage (step S4) and analysis (step S5) are necessarily repeated by n-times (n is an integer) as indicated by step S6. Furthermore, the application of the sense current and the write current (step S3), the detection of the output voltage (step S4) and analysis (step S5) are necessarily repeated by m-times (m is an integer) as indicated by step S7.

Then, at step S8, it is judged whether the tested magnetic head assembly is a good article or not depending upon whether Barkhausen noise is produced or not.

Figure 4A:
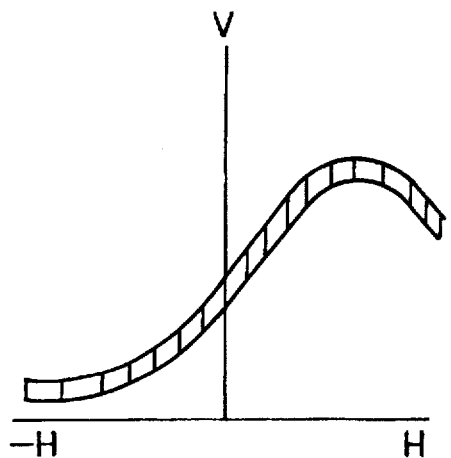
FIGS. 4a and 4b are graphs illustrating head output voltage (V) characteristics with respect to varied external magnetic field (H) under the application of alternating leakage magnetic field from an inductive write element.
Figure 4B:
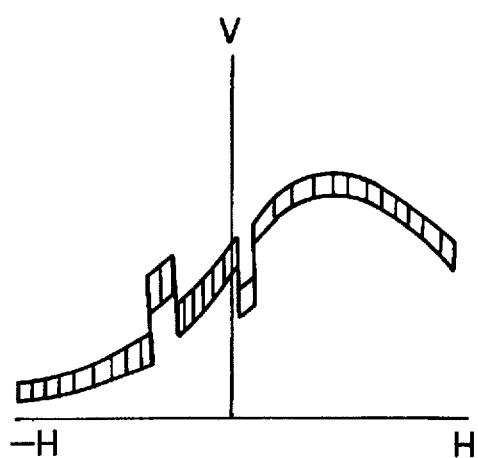

FIGS. 4a and 4b illustrate head output voltage (V) characteristics with respect to varied external magnetic field (H) under the application of alternating leakage magnetic field from the inductive write element. Namely, FIGS. 4a and 4b illustrate MR loop characteristics.

As illustrated in FIG. 4a, in case of a good magnetic head assembly with no generation of Barkhausen noise, the output voltage from the MR element continuously and smoothly varies depending upon the variation of the applied magnetic field formed by adding the high frequency rectangular leakage magnetic flux onto the sine wave external magnetic flux which slowly changes. However, as shown in FIG. 4b, if Barkhausen noise is generated, discontinuity will occur. At the step S8, the computer 12 judges the generation of Barkhausen noise by finding such discontinuity in the input data (output voltage from the MR element).

According to the above-mentioned test method, the MR loop characteristics can be measured from magnetic head assemblies aligned on and not yet individually separated from the head block 14. Thus, it is unnecessary to practically operate the finished head assembly on the rotating disk, causing the testing procedure to extremely shorten. Furthermore, from the MR loop characteristics, the computer 12 can easily obtain the magnitude of the output and also can quickly quantify Barkhausen noise which has been difficult to be quantified.

Particularly, according to this embodiment, since the alternating leakage magnetic field with a high frequency due to the rectangular wave shape write current is applied to the MR read element in addition to the external alternating magnetic field which is applied to the MR read element in a direction perpendicular to the ABS 14a of the head block 14, and frequency of the write current is significantly higher than that of the external alternating magnetic field, possible Barkhausen noise can be detected with a very high probability and also this detection and judgment of whether or not a good article can be extremely quickly completed.

This is because Barkhausen noise will be easily produced due to application of the alternating leakage flux with a rectangular wave shape and a high frequency. Since the frequency of this alternating leakage flux is a practically used frequency the test will be based on the practical usage. Furthermore, since the alternating leakage flux passes not only the MR read element but also pole portions of the inductive write element abnormality of the magnetic domain structure in that pole portions can be also checked.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for testing an integrated magnetic head assembly for normal operation, said head assembly including an inductive write element and a magnetoresistive read element, said method comprising the steps of:

applying an external alternating magnetic field to a plurality of magnetic head assemblies aligned on a head block and are not yet individually separated from the head block, in a direction perpendicular to an air bearing surface of the head block;

applying high frequency current to an inductive write element of one of said plurality of head assemblies to be tested such that an alternating leakage magnetic field from the inductive write element is applied to the magnetoresistive read element of the same head assembly; and measuring varying resistance characteristics of the magnetoresistive read element with respect to the variation of said external alternating magnetic field and to the variation of said alternating leakage magnetic field.

2. The method as claimed in claim 1, wherein a frequency of said high frequency current applied to said inductive write element is higher than a frequency of said external alternating magnetic field.

3. The method as claimed in claim 2, wherein said high frequency current applied to said inductive write element is a rectangular wave shaped current.

4. The method as claimed in claim 3, wherein said external alternating magnetic field is a sine wave shaped magnetic field.

5. An apparatus for testing an integrated magnetic head assembly for normal operation, the head assembly including an inductive write element provided with input terminals and a magnetoresistive read element provided with input terminals, said apparatus comprising:

probe means for electrically contacting to said input terminals and to said output terminals of each of magnetic head assemblies which are aligned on a head block and are not yet individually separated from the head block;

external field applying means for applying an external alternating magnetic field to said magnetic head assemblies aligned on the head block, in a direction perpendicular to an air bearing surface of the head block;

current applying means for applying high frequency current to an inductive write element of one of said head assemblies to be tested via said probe means such that an alternating leakage magnetic field from the inductive write element is applied to a magnetoresistive read element of the same head assembly to be tested; and means for measuring varying resistance characteristics of said magnetoresistive read element with respect to the variation of said external alternating magnetic field, by receiving output voltage across the output terminals of said magnetoresistive read element via said probe means when said external alternating magnetic field is applied to said magnetic head assemblies and the high frequency current is applied to said inductive write element.

6. The apparatus as claimed in claim 5, wherein said current applying means consists of means for supplying high frequency current having a frequency higher than a frequency of said external alternating magnetic field.

7. The apparatus as claimed in claim 6, wherein said current applying means consists of means for supplying high frequency current with a rectangular wave shape.

8. The apparatus as claimed in claim 7, wherein said external field applying means consists of means for applying an external alternating magnetic field of a sine wave shape.

\* \* \* \* \*